US006477642B1

(12) United States Patent
Lupo

(10) Patent No.: US 6,477,642 B1
(45) Date of Patent: Nov. 5, 2002

(54) METHOD AND APPARATUS FOR EXTENDING BIOS CONTROL OF SCREEN DISPLAY BEYOND OPERATING SYSTEM BOOT PROCESS

(75) Inventor: Van Anthony Lupo, Huntington Beach, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,180

(22) Filed: Jun. 18, 1999

(51) Int. Cl.[7] .............................. G06F 3/00; G06F 13/00
(52) U.S. Cl. ............................................. 713/2; 713/1
(58) Field of Search ........................................ 713/1, 2

(56) References Cited

U.S. PATENT DOCUMENTS

| | | | |
|---|---|---|---|
| 5,121,345 A | 6/1992 | Lentz ........................ 713/188 |
| 5,128,995 A | 7/1992 | Arnold et al. ................. 713/1 |
| 5,131,089 A | 7/1992 | Cole ........................... 703/24 |
| 5,142,680 A | 8/1992 | Ottman et al. ................ 703/24 |
| 5,146,568 A | 9/1992 | Flaherty et al. ............... 703/24 |
| 5,214,695 A | 5/1993 | Arnold et al. ................. 713/2 |
| 5,274,816 A | 12/1993 | Oka ............................ 713/2 |
| 5,280,627 A | 1/1994 | Flaherty et al. ............... 713/2 |
| 5,307,497 A | 4/1994 | Feigenbaum et al. .......... 713/1 |
| 5,325,532 A | 6/1994 | Crosswy et al. ............... 713/2 |
| 5,379,431 A | 1/1995 | Lemon et al. ................ 710/10 |
| 5,381,549 A | 1/1995 | Tamura ......................... 713/1 |
| 5,418,918 A | 5/1995 | Vander Kamp et al. ........ 713/2 |
| 5,444,850 A | 8/1995 | Chang ....................... 709/222 |
| 5,448,741 A | 9/1995 | Oka ............................ 713/2 |
| 5,452,454 A | 9/1995 | Basu ............................ 713/2 |
| 5,463,766 A | 10/1995 | Schieve et al. ................ 713/2 |
| 5,469,573 A | 11/1995 | McGill, III et al. .......... 717/11 |
| 5,504,905 A | 4/1996 | Cleary et al. ............... 713/100 |
| 5,522,076 A | 5/1996 | Dewa et al. ................... 713/2 |
| 5,526,523 A | 6/1996 | Straub et al. ............... 713/100 |
| 5,542,082 A | 7/1996 | Solhjell ....................... 711/115 |
| 5,581,740 A | 12/1996 | Jones .......................... 703/25 |
| 5,586,327 A | 12/1996 | Bealkowski et al. ........... 713/2 |
| 5,594,903 A | 1/1997 | Bunnell et al. ................ 717/11 |
| 5,600,766 A * | 2/1997 | Deckys et al. .............. 354/641 |
| 5,604,890 A | 2/1997 | Miller ......................... 703/23 |
| 5,652,868 A | 7/1997 | Williams ...................... 703/23 |
| 5,652,886 A | 7/1997 | Tulpule et al. ................ 713/2 |
| 5,664,194 A | 9/1997 | Paulsen ...................... 717/11 |
| 5,680,547 A | 10/1997 | Chang ....................... 709/222 |
| 5,692,190 A | 11/1997 | Williams ...................... 713/2 |
| 5,694,583 A | 12/1997 | Williams et al. .............. 703/24 |
| 5,694,600 A | 12/1997 | Khenson et al. ............... 713/2 |
| 5,701,477 A | 12/1997 | Chejlava, Jr. ................. 713/2 |
| 5,715,456 A | 2/1998 | Bennett et al. ................ 713/2 |
| 5,717,930 A | 2/1998 | Imai et al. ................... 717/11 |
| 5,727,213 A | 3/1998 | Vander Kamp et al. ........ 713/2 |
| 5,732,268 A | 3/1998 | Bizzarri ....................... 713/2 |
| 5,748,957 A | 5/1998 | Klein .......................... 713/2 |
| 5,754,853 A | 5/1998 | Pearce ......................... 713/2 |
| 5,764,593 A | 6/1998 | Turpin et al. ................. 713/2 |

(List continued on next page.)

*Primary Examiner*—Jeffrey Gaffin
*Assistant Examiner*—Tammara Peyton

(57) ABSTRACT

A method and apparatus for extending basic input output system (BIOS) control of the display screen beyond the loading of the operating system is described. In one embodiment, the BIOS, during power-on self test (POST), writes content to the display screen, redirects a video controller interrupt vector to a new handler, and traps I/O accesses to the video controller. During the time the operating system is starting, accesses to the video controller, through the interrupt vector or directly, is intercepted and/or redirected. Once the operating is loaded, the original interrupt vector is restored, and trapping of I/O accesses to the video controller is disabled, allowing the operating system to take control of the video controller and hence the display screen.

19 Claims, 14 Drawing Sheets

U.S. PATENT DOCUMENTS

| | | | |
|---|---|---|---|
| 5,781,758 A | 7/1998 | Morley | 703/23 |
| 5,790,849 A | 8/1998 | Crocker et al. | 713/2 |
| 5,796,984 A | 8/1998 | Pearce et al. | 703/24 |
| 5,802,363 A | 9/1998 | Williams et al. | 713/2 |
| 5,805,880 A | 9/1998 | Pearce et al. | 713/2 |
| 5,805,882 A | 9/1998 | Cooper et al. | 713/2 |
| 5,815,706 A | 9/1998 | Stewart et al. | 713/2 |
| 5,819,063 A | 10/1998 | Dahl et al. | 703/27 |
| 5,828,888 A | 10/1998 | Kozaki et al. | 717/11 |
| 5,832,251 A | 11/1998 | Takahashi | 703/23 |
| 5,842,011 A | 11/1998 | Basu | 713/2 |
| 5,854,905 A | 12/1998 | Garney | 710/104 |
| 5,864,698 A | 1/1999 | Krau et al. | 713/2 |
| 5,887,164 A | 3/1999 | Gupta | 713/2 |
| 5,901,310 A | 5/1999 | Rahman et al. | 713/1 |
| 5,907,679 A | 5/1999 | Hoang et al. | 709/220 |
| 6,049,871 A * | 4/2000 | Silen et al. | 713/2 |

* cited by examiner

METHOD AND APPARATUS FOR EXTENDING BIOS CONTROL OF SCREEN DISPLAY BEYOND OPERATING SYSTEM BOOT PROCESS

BACKGROUND OF THE INVENTION

1. Field of the Invention

The present invention relates generally to the field of computer systems, and specifically, to a method and apparatus for extending basic input output system control of screen display beyond operating system boot process.

2. Background Information

In a typical computer, such as a PC-compatible computer, the boot process involves performing various system tests and displaying a basic input-output system (BIOS) information screen. This time period is referred to as power on self test (POST). Once the BIOS completes the POST, it loads a native operating system. The operating system then replaces the BIOS information screen with the operating system's own display screen. The operating system, such as for example, the Windows™ operating system, displays its own proprietary splash or cloud screen while the operating system is loading. The display screen shows a static, graphical company logo and product image with an activity indicator. The activity indicator generally shows activity near the bottom of the screen either using color manipulation or presenting a progress bar with color filling to indicate the current progress of the operating system loading.

During the time the operating system is loading, there is no informational content displayed on the screen for the user. This is exasperated by the fact that the time spent loading the operating system is significantly longer then the POST of the BIOS. Consequently, a much shorter duration of time is given to the user to view and read the contents of the BIOS information screen display or other content for viewing by users.

SUMMARY OF THE INVENTION

The present invention comprises a method for controlling a video controller. In one embodiment, the method includes configuring a video controller to write data to an unused area of a video memory and to display the data in the unused area of the video memory on a display screen, and configuring the video controller so that data is written to a second area in video memory. The method further includes starting an operating system, intercepting accesses to the video controller, and configuring the video controller to display data written in the second area of video memory when the operating system is loaded.

DETAILED DESCRIPTION

Figure 1:
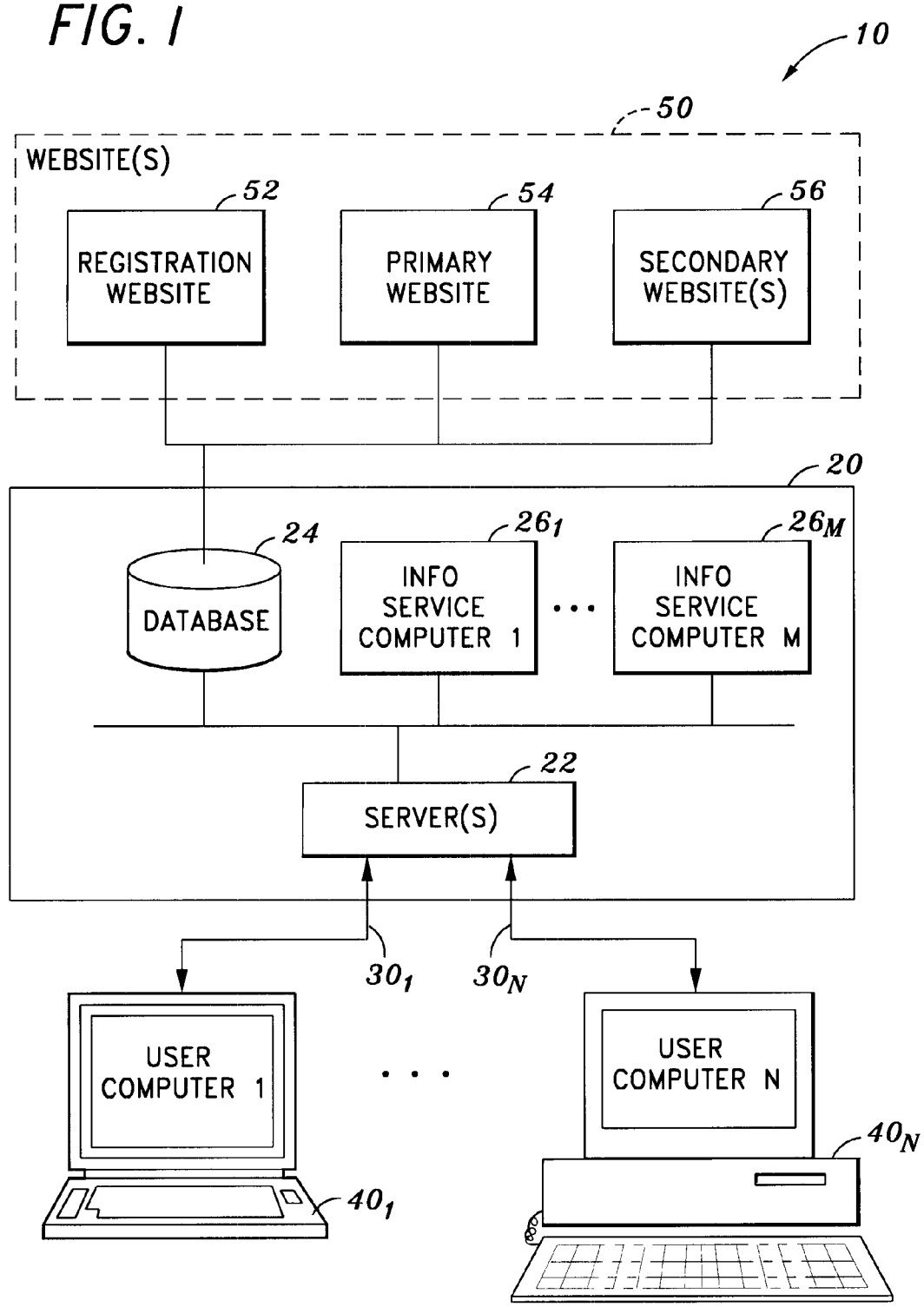
FIG. 1 is a system block diagram of one embodiment of an information distribution system in which the apparatus and method of the invention is used.

The present invention comprises a method and apparatus for extending basic input output system (BIOS) control of the display screen beyond the loading of the operating system. In one embodiment, the BIOS, during power-on self test (POST), writes content to the display screen, redirects a video controller interrupt vector to a new handler, and traps I/O accesses to the video controller. During the time the operating system is loading, I/O accesses to the video controller, using the interrupt vector or directly, is intercepted and/or redirected. Once the operating is loaded, the original interrupt vector is restored, and trapping of I/O accesses to the video controller is disabled.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications. Power On Self Test (POST) refers to the instructions that are executed to configure and test the system hardware prior to loading an OS.

System Overview

A description of an exemplary system, which incorporates embodiments of the present invention, is hereinafter described.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, messages with graphics or informational material, animation, Joint Photographic Experts Group (JPEG)/ Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289, entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
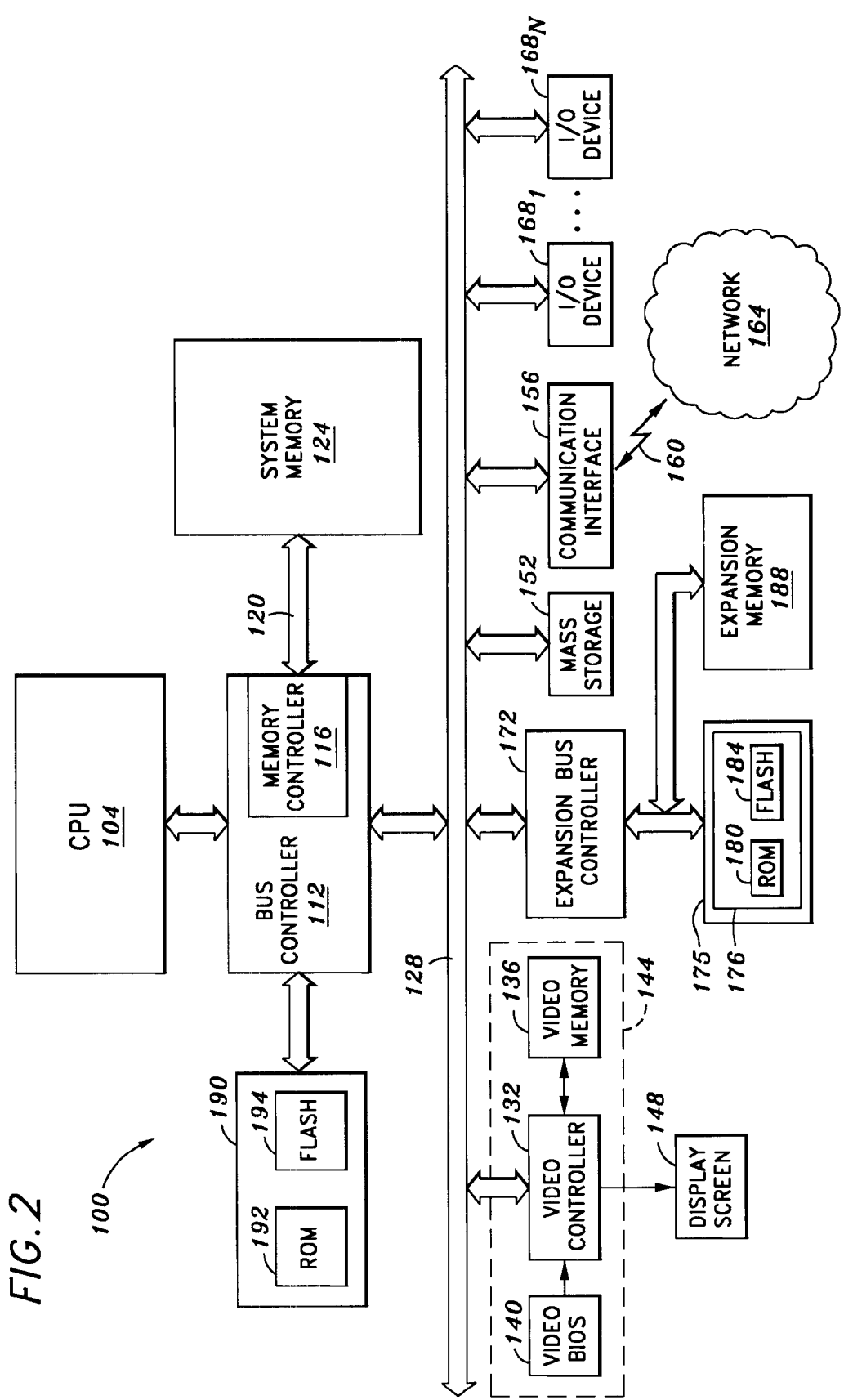
FIG. 2 illustrates an exemplary processor system or user computer system which implements embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capacity media device, and/or any combination thereof. The expansion bus controller 172 is coupled to non-volatile memory 175 which includes system firmware 176. The system firmware 176 includes system BIOS (numeral 82, FIG. 3), which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 3:
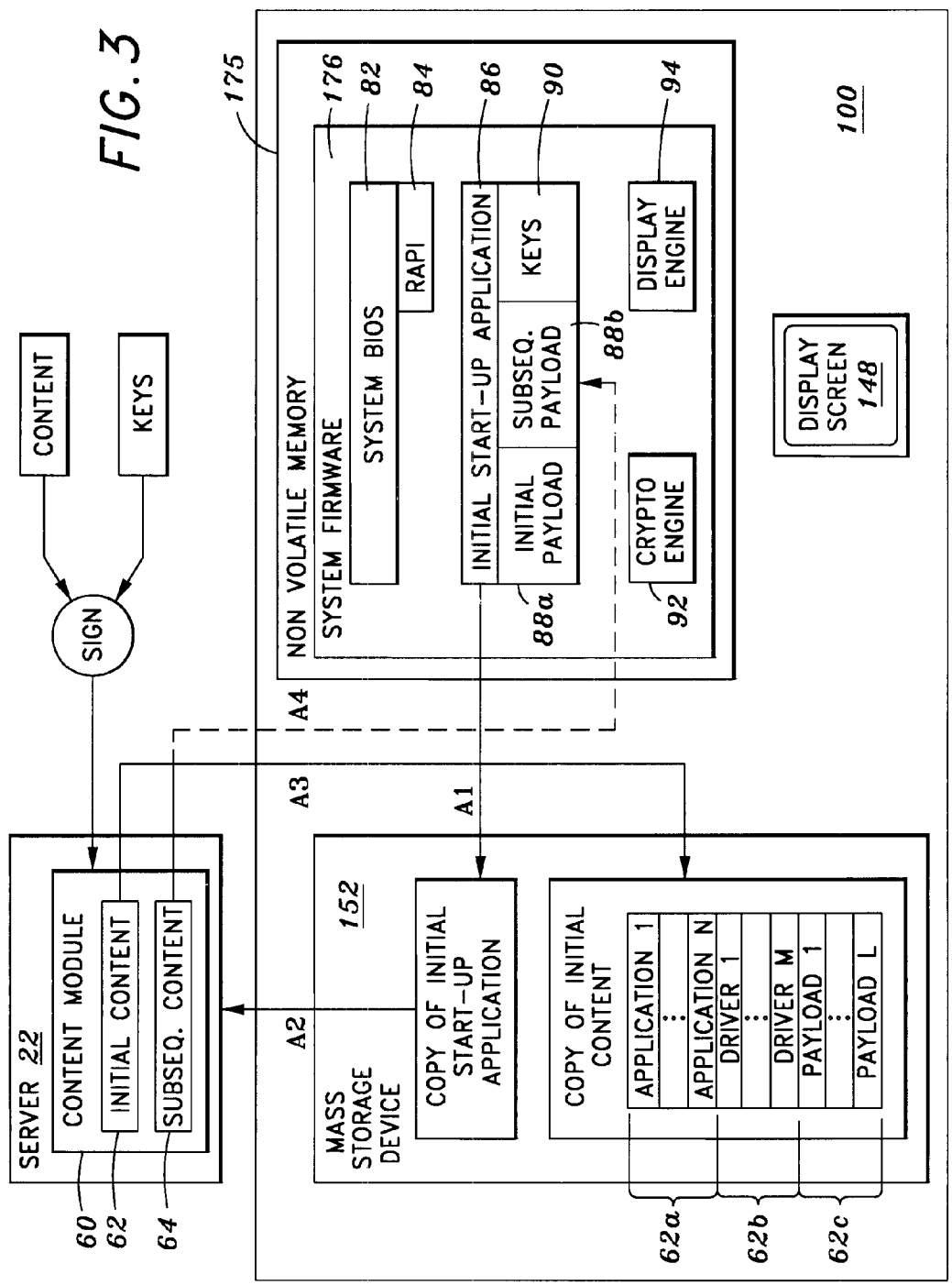
FIG. 3 illustrates a logical diagram of one embodiment of the invention.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88a, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. RAPI 84 provides a secure interface between ROM application programs and system BIOS 82. The RAPI 84, ISUA 86, and initial payload 88a may each be separately developed and stored in the system firmware 176 prior to initial use of the computer system 100. In one embodiment, the RAPI 84, ISUA 86, and initial payload 88a each includes proprietary software developed by Phoenix Technologies, Ltd. One embodiment of RAPI 84 is described in co-pending U.S. patent application Ser. No. 09/336,889 entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289 entitled "Method and Apparatus for Automatically Installing and Configuring Software on a Computer," filed on Jun. 18, 1999, assigned to Phoenix Technologies, Ltd., and which is incorporated herein by reference.

Figure 4A:
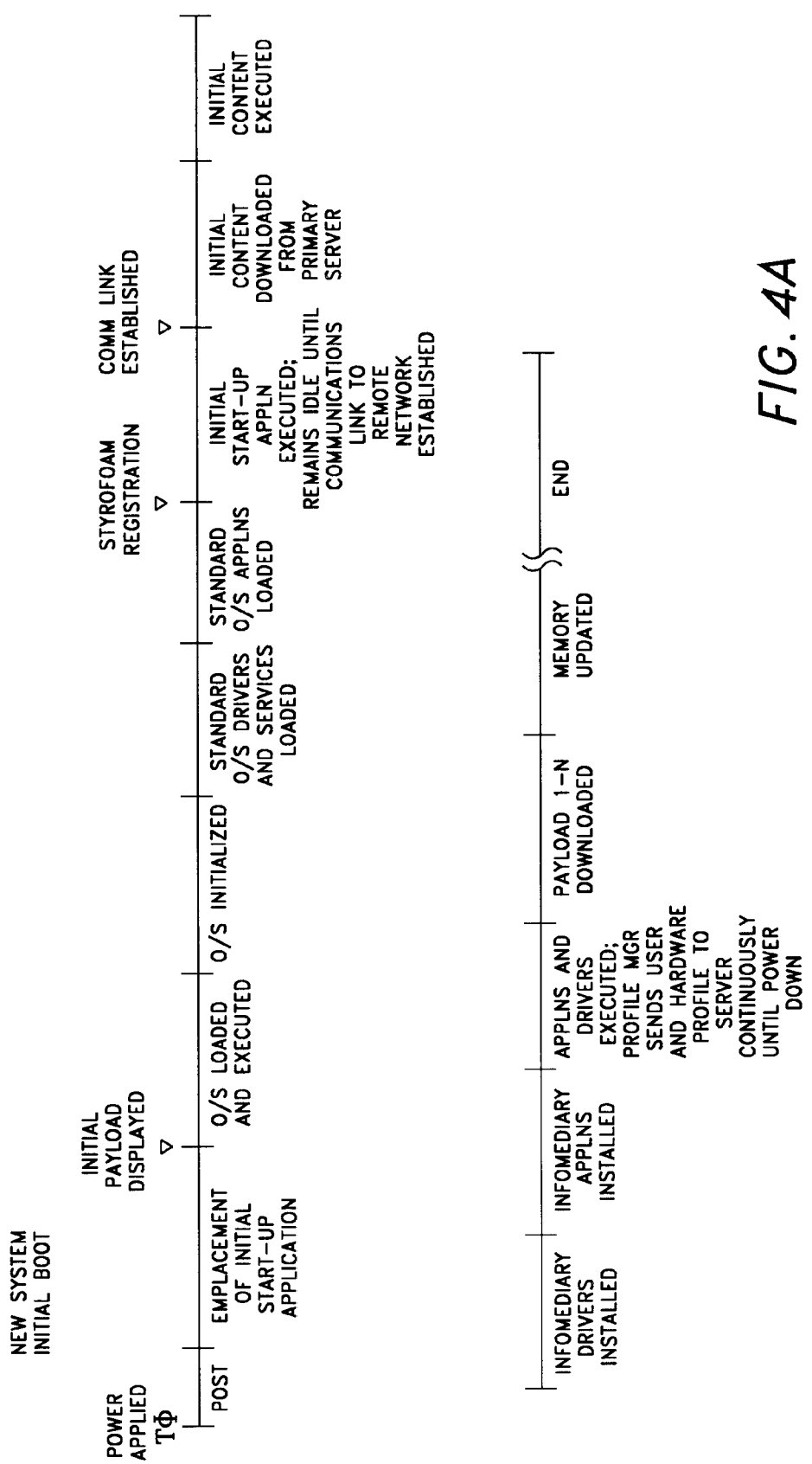
FIGS. 4A and 4B illustrate one embodiment of a process flow chart provided in accordance with the principles of the invention.
Figure 4B:
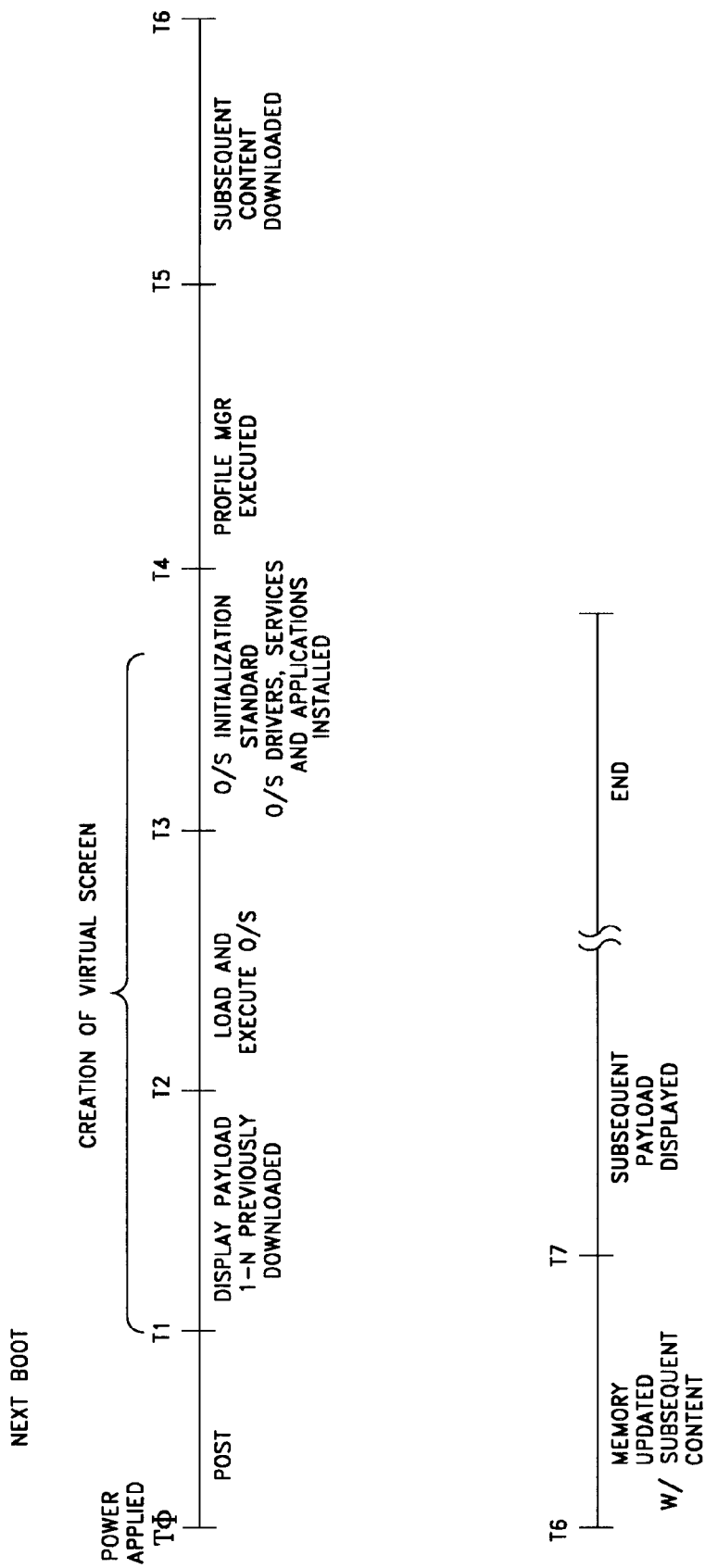

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067 entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. patent Continuation-in-Part application Ser. No. 09/336,307 entitled "Method and Apparatus for Providing Memory-Based Device Emulation" filed on Jun. 18, 1999, and in co-pending U.S. patent application Ser. No. 09/336,281 entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62*a*, drivers 62*b*, and payloads 62*c*. In one embodiment, the applications 62*a* include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88*b*. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003 entitled "Displaying Images during Boot-up and Shut-down" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320x400 and 256 colors although Windows™ will later stretch the resolution to 640x400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages with graphics or informational material. In a further embodiment, the messages with graphics or informational material may again be displayed during the shut-down process, for example, replacing the screen display that displays the message "Windows is shutting down" or "It is now safe to turn off your computer" with other selected content.

Figure 5:
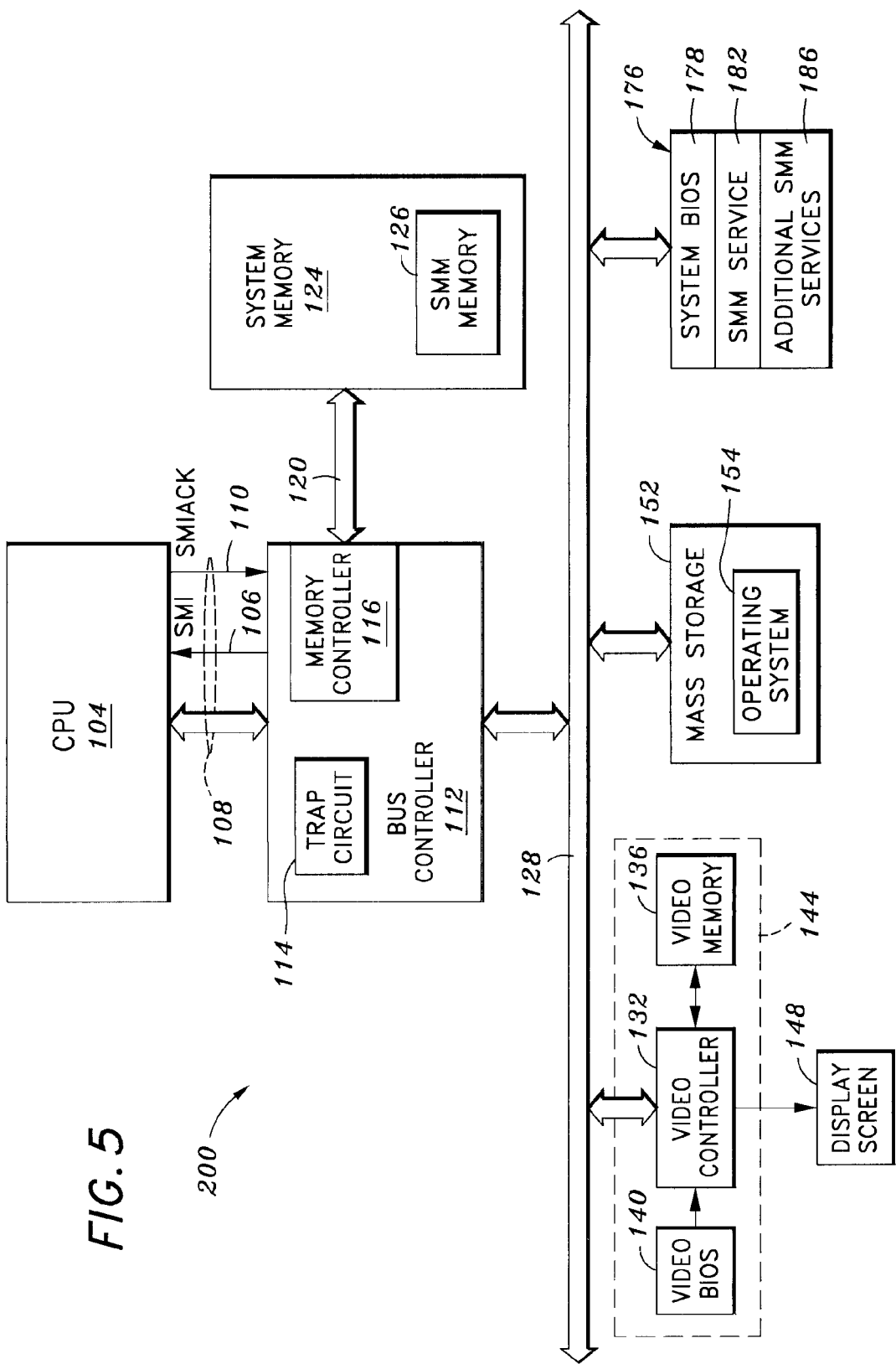
FIG. 5 illustrates a block diagram of a computer system suitable for use with the present invention.

FIG. 5 illustrates a block diagram of a computer system 200 suitable for use with the present invention. The computer system 200 is similar to the computer system 100 of FIG. 2, though further details are provided herein for describing embodiments of the present invention. Components in FIG. 5 that are identical or similar to components in FIG. 2 are labeled alike.

Referring to FIG. 5, part of the CPU bus 108 is signal line 106 having a system management interrupt (SMI) signal thereon which is generated by the bus controller 112, and signal line 110 having a SMI acknowledge (SMIACK) signal thereon which is generated by the CPU 104 responsive to assertion of the SMI signal. Assertion of the SMI signal causes the CPU 104 to enter in the system management mode (SMM), as will be described in detail in the following sections. A portion of system memory 124 is dedicated for SMM memory 126.

In addition, the bus controller 112 includes a trap circuit 114 used to trap and intercept accesses to memory and input/output (I/O) addresses and/or address ranges. More specifically, the trap circuit 114 intercepts accesses to one or more target addresses and/or address ranges by the CPU 104 or any other device in the system 200, and asserts the SMI signal to cause the CPU 104 to enter the SMM mode. The trap circuit 114 need not be located in the bus controller 112, and may be situated anywhere in the system 200 so long as target addresses and/or address ranges can be trapped and intercepted. The bus and memory controllers 112 and 116 are typically integrated into what is termed a chipset to provide power management BIOS services. An example of such a chipset includes the Intel™ 440BX.

The mass storage device 152 contains operating system 154, which is loaded into system memory 124 and executed after POST. The BIOS device 176 includes a system BIOS module 178 for controlling hardware in the computer system 200, SMM module 182 having SMM services for running in the SMM mode, and additional SMM services 186 in connection with the present invention, as will be described in more detail below. It must be noted that in this embodiment, the BIOS 176 is coupled to the system bus 128 rather than the expansion bus, as shown in FIG. 2. However, the different configurations are immaterial to the teachings of the present invention.

SMM is typically used to implement intelligent power management system functions in firmware in a manner that is completely transparent to the operating system and application software. Through the use of the additional SMM services 186, however, SMM is also used to trap and intercept memory and/or I/O target addresses such that temporary control of the video controller 132, video memory 136, and display screen 148 is maintained by the BIOS while the operating system is loading (into system memory 124).

SMM is invoked by asserting the SMI signal on signal line 106 to the CPU 104. The CPU 104, in response, asserts the SMIACK signal on signal line 110 and accesses SMM memory 126. SMM memory 126 is a memory space dedicated and secured for use in SMM only, i.e., the operating system and application software do not have access to this space. The current CPU 104 state (context) is stored in SMM memory 126 after assertion of the SMIACK signal and the CPU 104 then jumps to a location in SMM memory 126 to execute the SMI handler code for performing the system management activities. Upon completion of the system management activities, the SMI handler executes a resume (RSM) instruction which restores the CPU 104's context from SMM memory 126, de-asserts the SMIACT signal, and then returns control to the previously interrupted operating system or application program execution.

Figure 6:
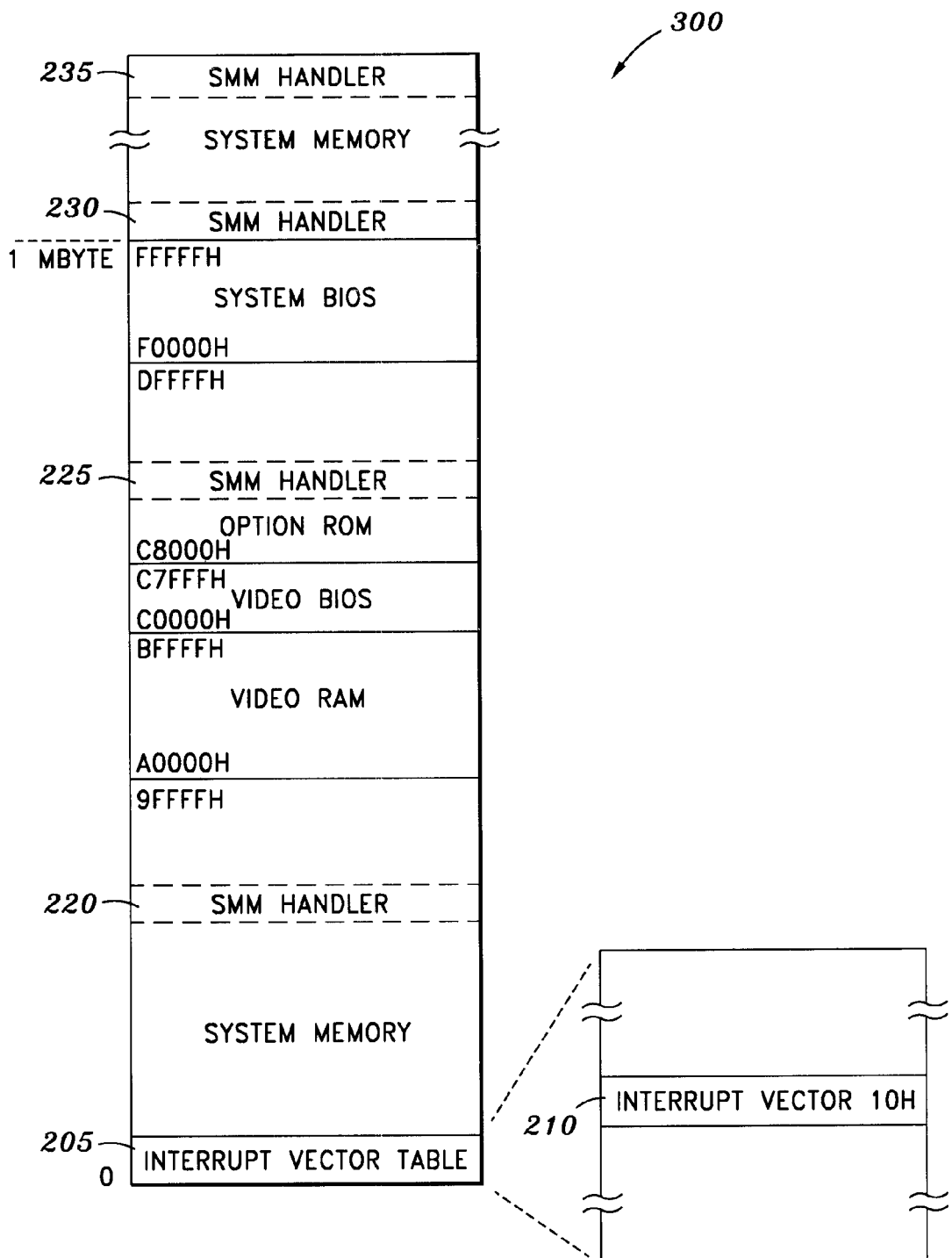
FIG. 6 illustrates an exemplary system address map for the computer system of FIG. 5, according to one embodiment of the present invention.

FIG. 6 illustrates an exemplary system address map 300 for the computer system 200 of FIG. 5, according to one embodiment of the present invention. During POST, the BIOS commences with configuration and verification of components contained within the computer system 200. Referring to FIGS. 5 and 6, the contents of the system BIOS 178 are loaded into system addresses E0000H or F0000H to FFFFFH (commonly known as shadowing), the contents of video BIOS 140 are loaded into addresses C0000H–C7FFFH, and system addresses A0000H–BFFFFH are reserved for video memory. System addresses C8000H–DFFFFH and E0000H–EFFFFH (if available) are often mapped to option ROMs for peripheral devices (e.g., Local area network cards, small computer system interface "SCSI" cards, PCMCIA cards, etc.). The lower 640 Kbytes of system address, that is, address range 0H–9FFFF, and system addresses 100000H (1 Mbyte) and beyond are mapped to system memory for the operating system and application program use. The base portion of the system map 200 includes an interrupt vector table 205, which is loaded by the system BIOS 178 during POST. The interrupt vector table 205 includes a plurality of vectors (addresses) which point to interrupt handlers. The INT 10H 210, which is located in the interrupt vector table 205, is normally used to access the video controller (and thus the display) via the system BIOS 178 and/or the video BIOS 140. The video BIOS 140 typically modifies the INT 10H vector to point to a portion of the video BIOS code, which is loaded into addresses C0000H C7FFFH–C7FFFH.

The SMM services 182 and the additional SMM services 186 are loaded into the SMM memory 126 during POST. The SMM memory 126 may be placed in a number of locations in the system address map 200. In one embodiment, the SMM memory 126 is located in system memory below 640 Kbytes, as shown by numeral 220. In another embodiment, the SMM memory 126 is mapped into the option ROM area between C8000H–DFFFFH, as shown by numeral 225. In yet another embodiment, the SMM memory 126 is mapped into system memory above 1 Mbytes, as shown by, for example, numerals 230 and 235. It is to be noted that the SMM memory 126 can be mapped in other places, and the location of the SMM memory 126 is not critical in practicing the present invention.

There are two ways to control the video controller 132 and hence what is displayed on the display screen 148. Stated another way, accesses (reads and writes) to the video controller 132 by the operating system and application programs are performed using two techniques.

Figure 7:
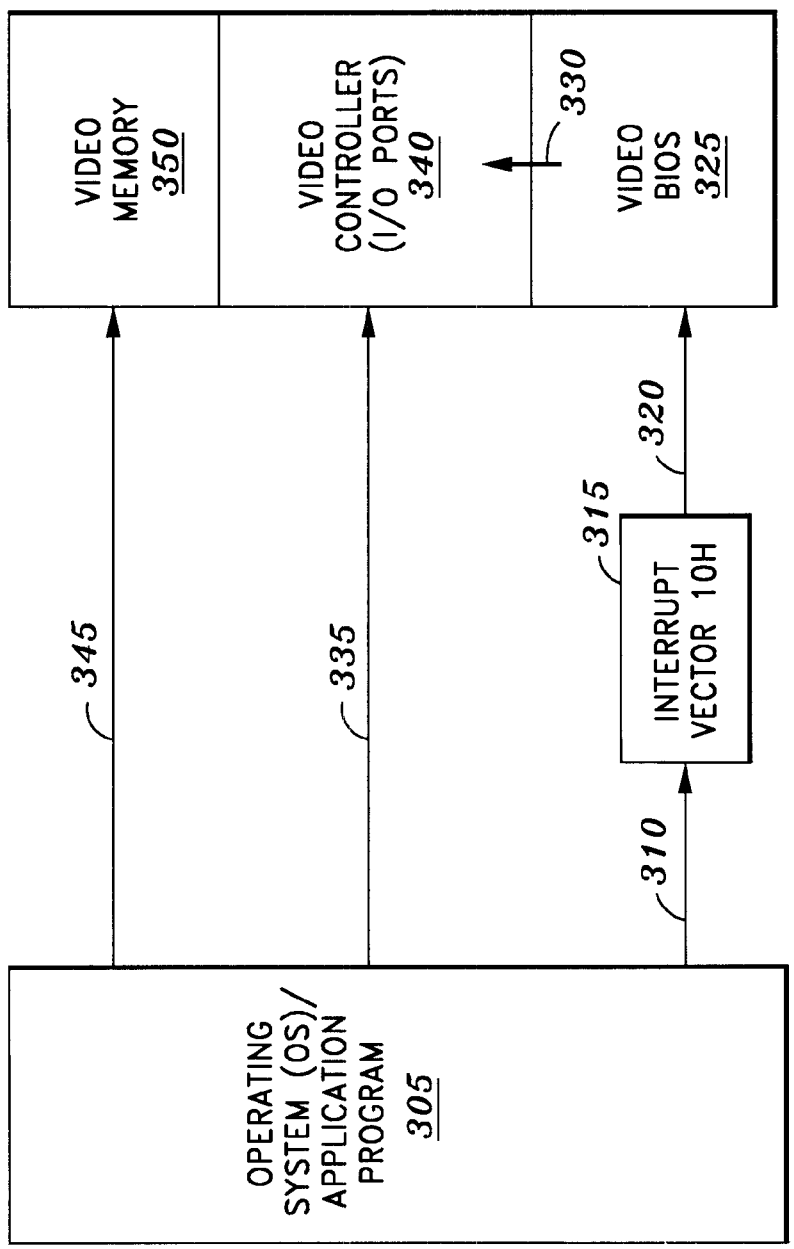
FIG. 7 shows a logical diagram of the different techniques used to control the video controller.

FIG. 7 shows a logical diagram of the different techniques used to control the video controller. The first technique involves accessing the video controller via BIOS using interrupt handler 10 (INT 10H). In this technique, the operating system or application program, designated generally by numeral 305, issues an INT 10H call (designated as numeral 310) to control the video controller 340. The INT 10H call causes the CPU to load the vector (address) 315 assigned to the INT 10H, and jump, as designated by numeral 320, to the address of the interrupt 10H handler located in video BIOS 325 (or system BIOS). The interrupt handler located in video BIOS 325 then accesses and modifies setting of the video controller 340, as shown by arrow 330.

The second technique involves accessing and modifying settings of the video controller 340 directly, as shown by numeral 335, and writing data to video memory 350 directly for display, as shown by arrow 345. The video controller 340 registers are typically mapped to I/O address space, while the video memory 350 is mapped into system memory space.

With the present invention, however, accesses to the video controller 340 (registers) and video memory 350 using the aforementioned techniques are intercepted such that control of the video controller 340 is maintained for displaying content while the operating system is loading without interfering with and operating independent of the operating system. Once the operating system is loaded and ready to execute, the mechanism of the present invention completely relinquishes control of the memory controller (and the display screen).

Figure 8:
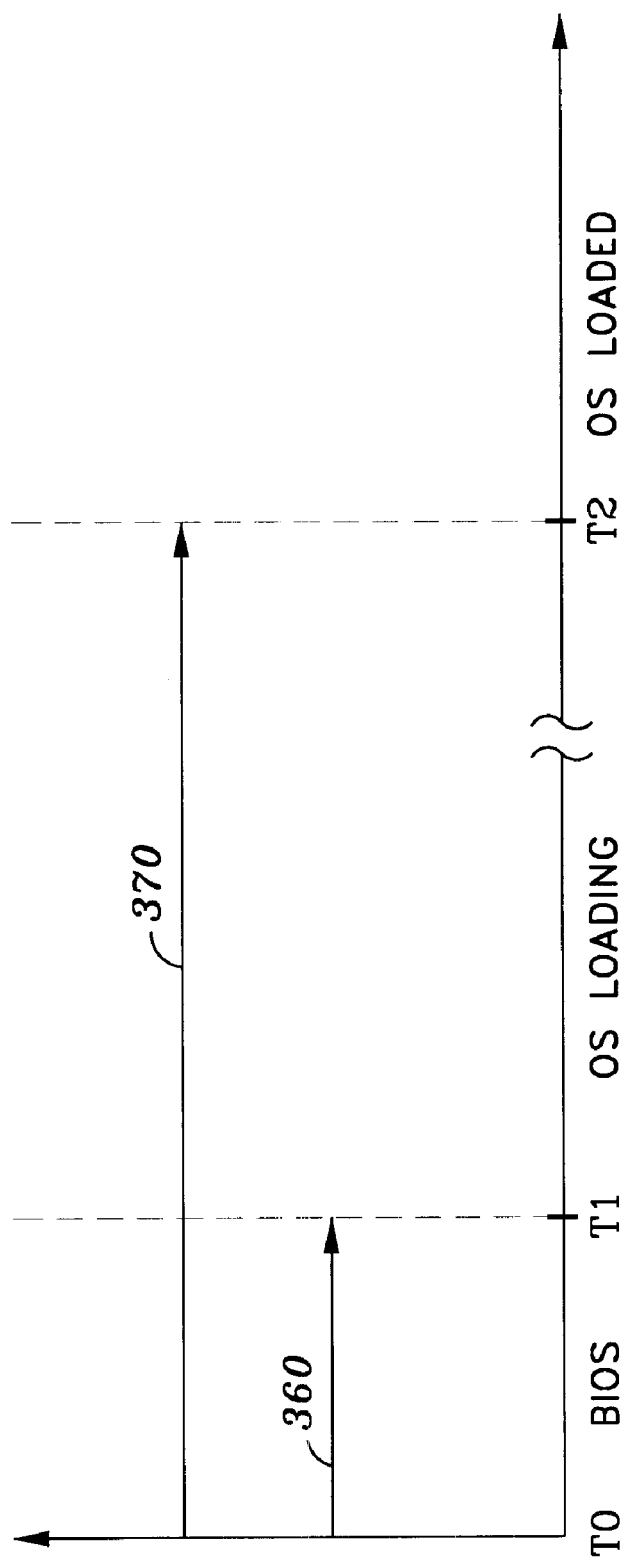
FIG. 8 is a timing diagram showing the extended control of the display screen in accordance with the teachings of the present invention.

FIG. 8 is a timing diagram showing the extended control of the display screen in accordance with the teachings of the present invention. Referring to FIG. 8, at time T0, the computer system commences with POST. From time T0 to time T1, the BIOS performs POST and has control of the display screen, as shown by arrow 360. At time T1, the BIOS initiates loading of the operating system. In the prior art, this also meant turning over control of the display screen to the operating system. However, with the present invention, control of the display screen is maintained by the BIOS (e.g., system BIOS) beyond T1 and up to T2 as shown by arrow 370. At time T2, the operating system is loaded and operational, and takes control of the display screen. Consequently, the BIOS displays content on the display screen from time T0, past time T1, where the operating system is loading, and up to time T2, without interfering with the operating system.

Figure 9:
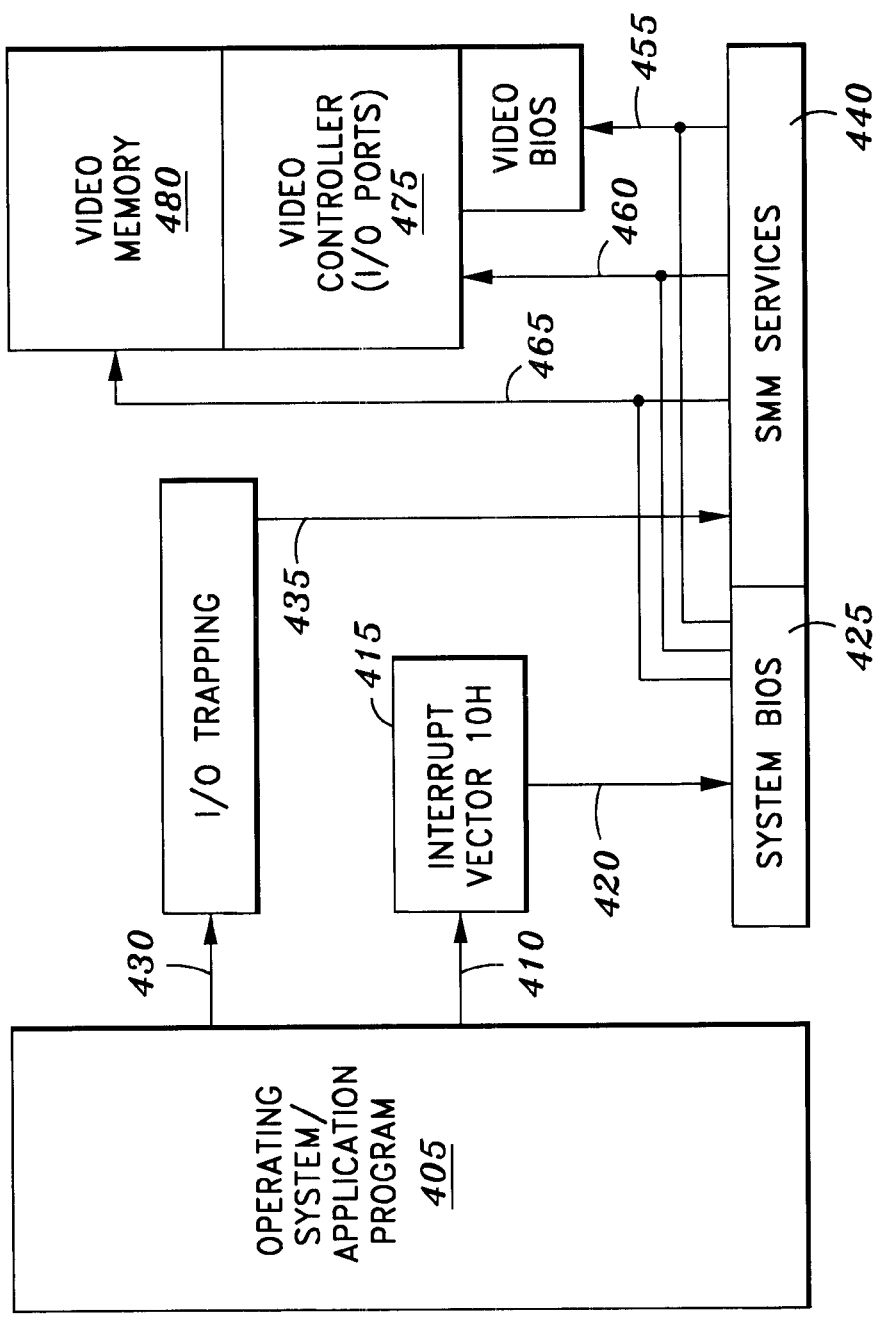
FIG. 9 shows a logical diagram of a method and apparatus for intercepting accesses to the video controller, according to one embodiment of the present invention.

FIG. 9 shows a logical diagram of a method and apparatus for intercepting accesses to the video controller, according to one embodiment of the present invention. Referring to FIG. 9, when the operating system or application program, designated generally as 405, makes an INT 10H call, designated as 410, the INT 10H vector (415) is redirected, as shown by arrow 420, to a handler in system BIOS 425 in accordance with the present invention. In addition, I/O accesses to the video controller 475 by the operating system or application programs 405, as shown by arrow 430, are trapped, causing the CPU to enter SMM and execute SMM services, as shown by 440. In SMM, the SMM services 440 may perform any of a number of operations including, but not limited or restricted to, calling video BIOS 470 as shown by arrow 455, and accessing the video controller 475 and video memory 480, as shown by arrows 460 and 465, respectively.

Figure 10:
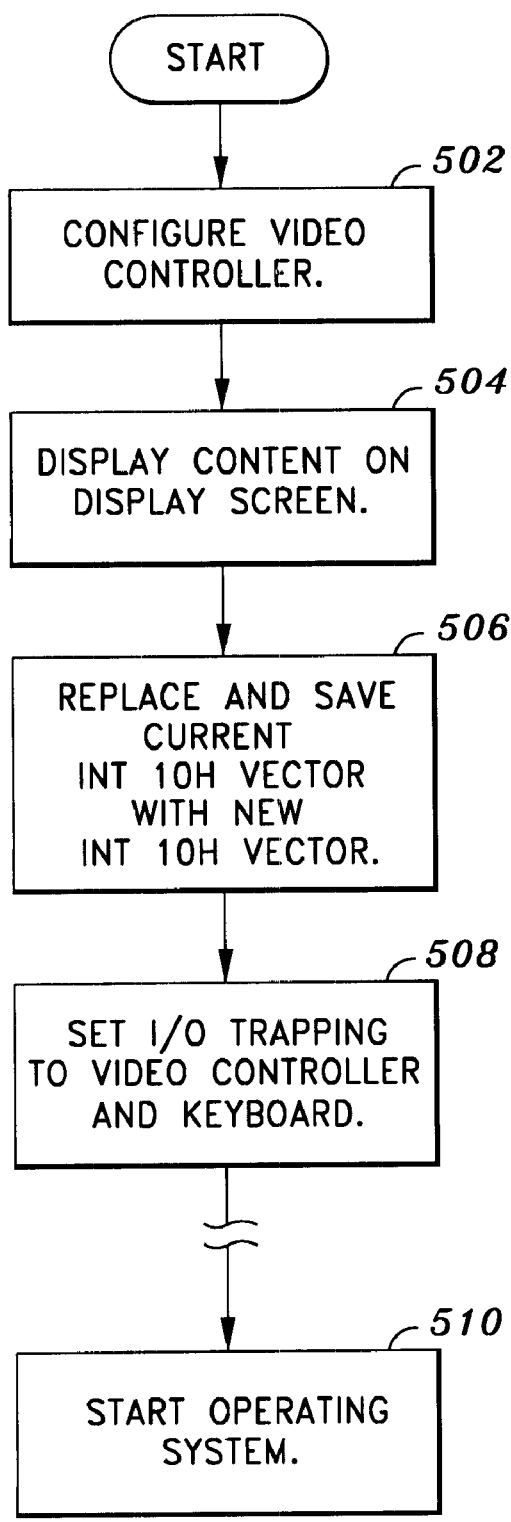
FIG. 10 is a flow diagram of a portion of system BIOS of FIG. 5, according to one embodiment.

FIG. 10 is a flow diagram of a portion of system BIOS 178 of FIG. 5, according to one embodiment. Referring to FIGS. 5 and 10, the system BIOS 178 is executed during BIOS POST. At some point during BIOS POST, the system BIOS configures the video controller 132 in a desired mode (block 502). In one embodiment, the video controller 132 is configured in a mode having one or more displayable pages in video memory 136. At block 504, the system BIOS writes content to be displayed on the display screen.

Figure 11:
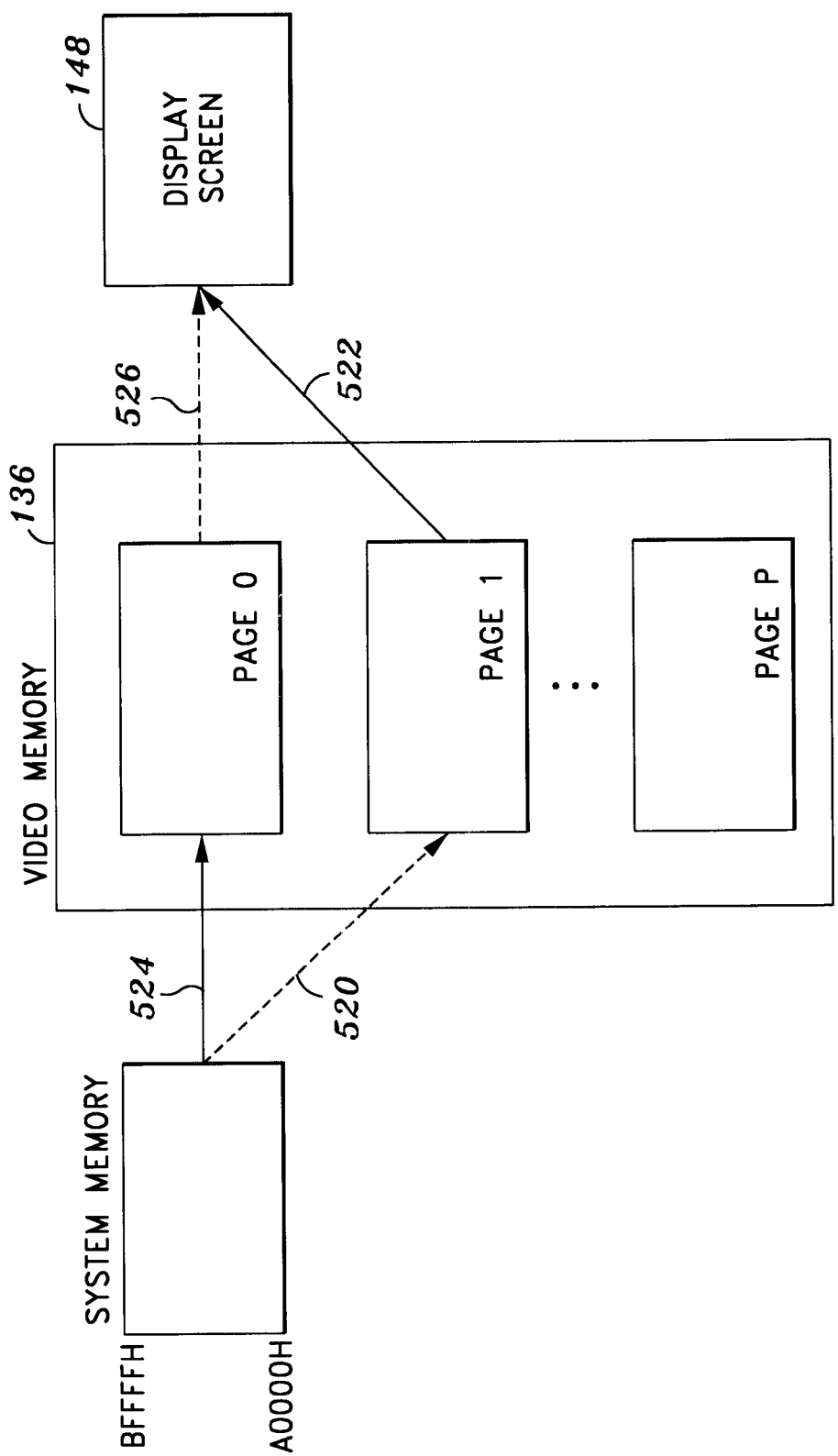
FIG. 11 is a logical diagram showing an exemplary embodiment of the video memory mapping.

FIG. 11 is a logical diagram showing an exemplary embodiment of the video memory 136 mapping. The video memory 136 is dividing into a plurality of pages PAGE 0 to PAGE P. In one embodiment, a page is defined as an arbitrary area of the video memory 136. The video controller 132 includes one or more registers for mapping the system memory (addresses A0000H–BFFFFH) to a page within the video memory 136. The system BIOS controls the video controller 132 such that content written to system memory (addresses A0000H–BFFFFH) is mapped to a page of the video memory 136. For sake of illustration, the content written to system memory is mapped to PAGE 1, as shown by dashed arrow 520. However, it is to be noted that the content may be mapped to any arbitrary page. The video controller 132 further includes one or more registers for mapping a page in the video memory 136 to the display screen 148. Thus, the system BIOS also controls the video controller 132 so that PAGE 1 is mapped to the display screen 148 for display, as shown by arrow 522. Moreover, once the system BIOS has written content to PAGE 1, then the system BIOS configures the video controller 132 so that the system memory is mapped to PAGE 0 so that whatever the operating system writes to video memory is placed in PAGE 0, as shown by arrow 524.

Figure 12:
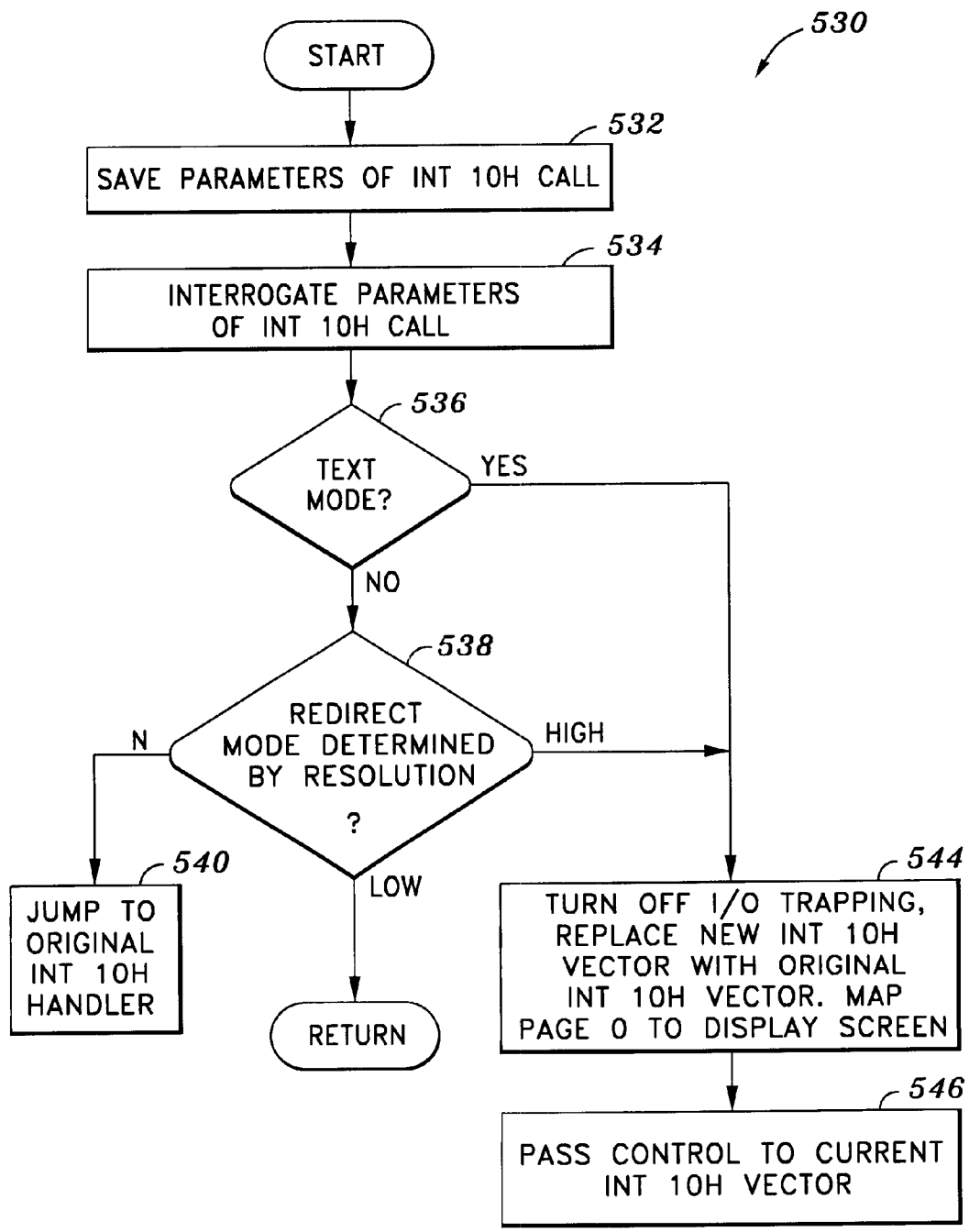
FIG. 12 is a flow diagram of a new INT 10H handler, according to one embodiment of the present invention.

Referring back to FIGS. 5 and 10, the system BIOS, at block 506, replaces and saves (in memory) the original INT 10H vector (e.g., which points to a handler in system BIOS 178 or, more typically, to video BIOS 140) with a new INT 10H vector that points to a new handler of the present invention (see FIG. 12). At block 508, the system BIOS 178 configures registers in the trap circuit 114 to trap I/O accesses to the video controller 132 (e.g., turns on I/O trapping) and the keyboard to trap depressions of the keyboard. At the end of BIOS POST, shown as block 510, the operating system is started.

FIG. 12 is a flow diagram of a new INT 10H handler 530, according to one embodiment of the present invention. In one embodiment, the new INT 10H handler 530 is invoked during the loading of the operating system. Referring to FIG. 12, the new handler 530 is executed in response to an INT 10H call and commences at block 532. At block 532, the parameter(s) of the INT 10H call (e.g., AL and AH register values) are saved in memory. The new handler 530, at block 534, interrogates the INT 10H parameter(s). If the parameter indicates that the video controller is being configured to text mode, then the new handler jumps to block 544. This may be an indication that the operating system is trying to display non-normal informational screens, which may be important. For example, in the Windows™ environment, if the operating system boots in safe mode, scandisk is loaded (e.g., because the computer system was shut-down without shutting down Windows™ first), or there are any other non-normal conditions, control of the display screen is completely relinquished by the system BIOS and given to the operation system (e.g., I/O trapping is disabled and new INT 10H is replaced with original INT 10H).

However, if the mode is not being changed to text mode, then, at block 538, it is determined whether the operating system is trying to redirect the mode, which, in one embodiment, is an arbitrary selection of a particular video resolution by the operating system. Typically, in the Windows™ environment, at the beginning of loading of the operating system, the operating system changes the mode of the video controller 132 to graphics mode (low resolution) to display its logo screen. This event or "redirected mode" can be captured. Other operating systems may similarly conduct a redirected mode during loading. The redirected mode of a particular operating system can be characterized such that loading of its logo screen is a discernable event.

If there is not a redirected mode, the handler 530 jumps to the original INT 10H handler (block 540). If the redirected mode is to a lower, graphics resolution or a characterized operating system resolution, this is an indication that the operating system is trying to configure the video controller into graphics mode in order to display its logo screen. In such case, the INT 10H call is blocked.

On the other hand, if the mode switch is to a higher resolution, this indicates that the operating system is loaded and is about to display its runtime environment. In the Windows™ environment, this is the Windows™ desktop. In this situation, the new handler 530 moves to block 544.

At block 544, trapping of I/O accesses to the video controller 132 and the keyboard are turned off, and the new INT 10H vector is replaced with the original INT 10H vector. In addition, the video controller 132 is controlled so that PAGE 0 is mapped to the display screen 148, as shown by dashed arrow 526 (FIG. 11). The new handler 530 then passed control to the original INT 10H vector (block 546). Thus, when the operating system is loaded, the new handler 530 is disabled, and I/O trapping is turned off, thereby relinquishing control of the video controller 132 and hence the display screen.

Figure 13:
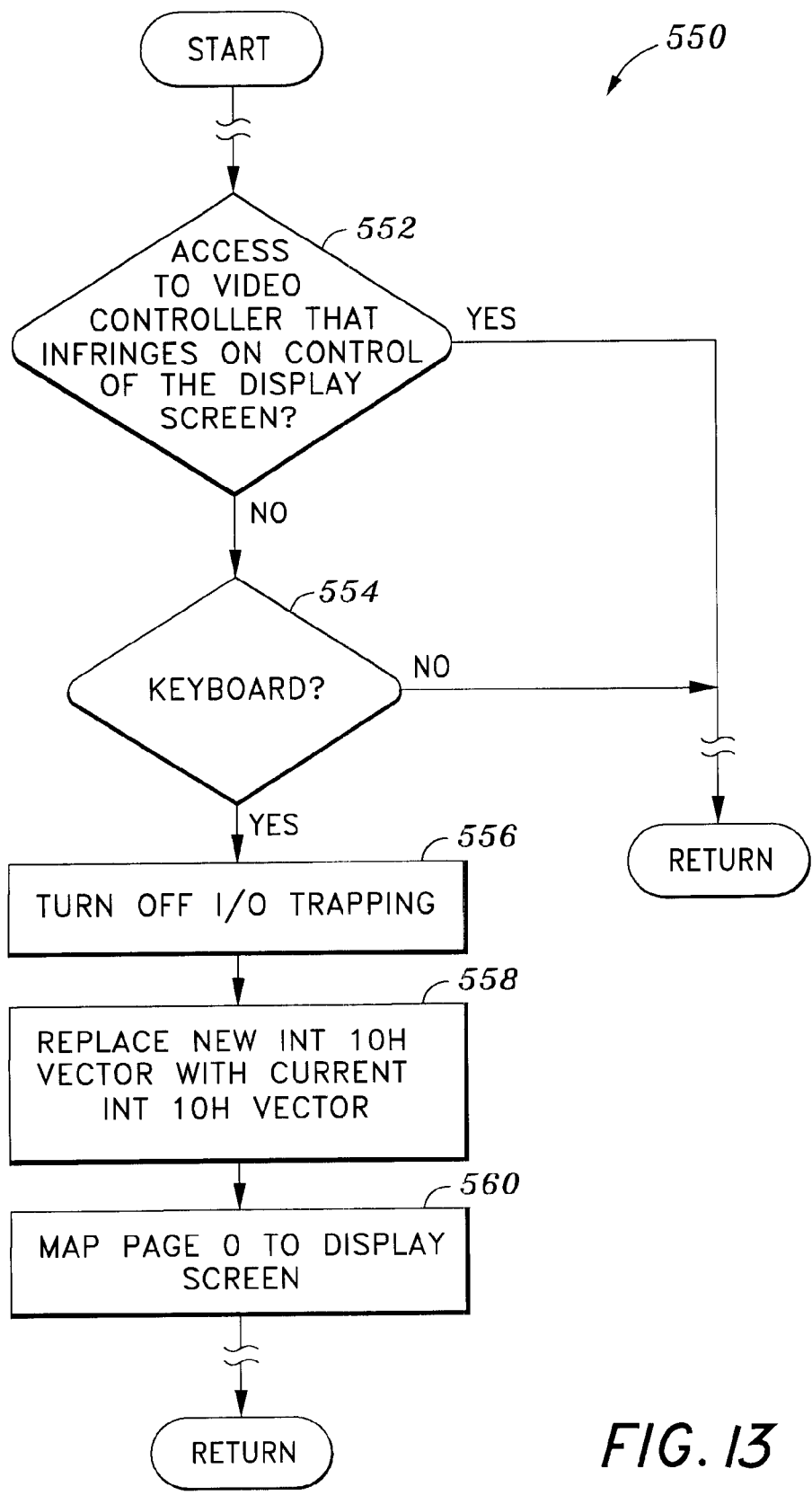
FIG. 13 shows a flow diagram of the additional SMM services, according to one embodiment of the present invention.

FIG. 13 shows a flow diagram 550 of the additional SMM services 186, according to one embodiment of the present invention. Referring to FIG. 13, the normal SMM services 182 (e.g., for providing power management services) are not shown here and portions or all of the SMM services 182 may occur before block 552, after block 560, and/or somewhere in-between blocks 552 and 560.

At block 552, if there is an I/O access to the video controller 132 that infringes on the control of the display screen, the I/O access is not performed (e.g., blocked). Certain accesses which do not affect control of the display screen 148 are allowed to pass through, while accesses which infringe on control of the display screen are blocked. Exemplary accesses that infringe on the control of the display screen include, among other things, changing resolutions of the video controller 132, changing the mapping of the system memory to a page in video memory 136, or changing the mapping of a page to the display screen.

If there is not an I/O access to the video controller 132, but a keyboard depression is detected (block 554), this is an indication that the user wishes to view the operating system display screen rather than the content that is displayed on the display screen by the system BIOS. In such a case, the additional SMM services 186 turns off trapping of I/O accesses to the video controller 132 (block 556), replaces the new INT 10H vector with the original INT 10H vector (block 558), and configures the video controller 132 to map PAGE 0 to the display screen 148 (block 560).

Through the use of the present invention, a method and apparatus for extending BIOS control of the display screen is provided such that content can be provided on the display screen during the time the operating system is loading. By using embodiments of the present invention, a user is provided with more time to view useful information such as, for example, system configuration, status, and other content.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of controlling a video controller, comprising:
   configuring a video controller to write data to an unused area of a video memory;
   configuring the video controller to display the data in the unused area of video memory on a display screen;
   a configuring the video controller so that additional data is written to a second area in video memory;
   starting an operating system;
   intercepting an access to the video controller; and
   determining if said operating system is attempting to set said video controller to a runtime video mode by interrogating one or more parameters of said access, and if so, configuring the video controller to display the additional data written in the second area of video memory.

2. The method of claim 1 wherein the unused area and the second area of video memory are non-overlapping areas.

3. The method of claim 1 wherein intercepting an access to the video controller comprises trapping one or more input/output addresses of the video controller.

4. The method of claim 3 wherein intercepting an access to the video controller comprises redirecting an interrupt vector that accesses the video controller.

5. A computer program product, comprising:
   a computer usable medium having computer program code embodied therein to configure a video controller to write data to an unused area of a video memory;
   computer readable program code to configure the video controller to display the data in the unused area of video memory on a display screen;
   computer readable program code to configure the video controller so that additional data is written to a second area in video memory;
   computer readable program code to start an operating system;
   computer readable program code to intercept an access to the video controller; and
   computer readable program code to determine if said operating system is attempting to set said video controller to a runtime video mode by interrogating one or more parameters of said access, and if so, to configure the video controller to display the additional data written in the second area of video memory.

6. The computer program product of claim 5 wherein the unused area and the second area of video memory are non-overlapping areas.

7. A computer system, comprising:
   a memory element having one or more instructions; and
   a processor coupled to the memory element, the processor, in response to the one or more instructions, to,
   configure a video controller to write data to an unused area of a video memory,
   configure the video controller to display the data in the unused area of video memory on a display screen,
   configure the video controller so that additional data is written to a second area in video memory,
   start an operating system,
   intercept an access to the video controller, and
   determine if said operating system is attempting to set said video controller to a runtime video mode by interrogating one or more parameters of said access, and if so configure the video controller to display the additional data written in the second area of video memory.

8. The method of claim 1, wherein intercepting an access to the video controller comprises replacing an original interrupt vector, which points to an original interrupt handler, with a new interrupt vector, which points to a new interrupt handler.

9. The method of claim 8, wherein determining if said operating system is attempting to set said video controller to a runtime mode further comprises determining if said operating system is attempting to set said video controller to one of a text video mode, a boot video mode and the runtime video mode, by interrogating one or more parameters of said access.

10. The method of claim 9, further comprising, when said operating system is attempting to set said video controller to the text video mode, restoring said original interrupt vector and configuring the video controller to display the additional data written in the second area of video memory.

11. The method of claim 9, further comprising, when said operating system is attempting to set said video controller to the boot video mode, blocking said access when said access would affect displaying said data on the display screen.

12. The method of claim 9, further comprising, when said operating system is attempting to set said video controller to the runtime video mode, restoring said original interrupt vector and configuring the video controller to display the additional data written in the second area of video memory.

13. The method of claim 8, further comprising, when said access is a predetermined user input, restoring said original interrupt vector and configuring the video controller to display the additional data written in the second area of video memory.

14. The computer system of claim 7, wherein said processor, in response to one or more instructions, is further to replace an original interrupt vector, which points to an original interrupt handler, with a new interrupt vector, which points to a new interrupt handler.

15. The computer system of claim 14, wherein said processor, in response to one or more instructions, to determine if said operating system is attempting to set said video controller to a runtime mode is further to determine if said operating system is attempting to set said video controller to one of a text video mode, a boot video mode and the runtime video mode, by interrogating one or more parameters of said access.

16. The computer system of claim 15, wherein said processor is further to, when said operating system is attempting to set said video controller to the text video mode, restore said original interrupt vector and configure the video controller to display the additional data written in the second area of video memory.

17. The computer system of claim 15, wherein said processor is further to, when said operating system is attempting to set said video controller to the boot video mode, block said access when said access would affect displaying said data on the display screen.

18. The computer system of claim 15, wherein said processor is further to, when said operating system is attempting to set said video controller to the runtime video mode, restoring said original interrupt vector and configuring the video controller to display the additional data written in the second area of video memory.

19. The computer system of claim 14, wherein when said access is a predetermined user input, said processor, in response to one or more instructions, is further to restore said original interrupt vector and configure the video controller to display the additional data written in the second area of video memory.

* * * * *